United States Patent
Soriano et al.

(10) Patent No.: US 7,650,450 B2
(45) Date of Patent: Jan. 19, 2010

(54) SERIAL BUS SYSTEM

(75) Inventors: David Soriano, Terrassa (ES); Pep-Lluis Molinet, Barcelona (ES); Marti Rius, Barcelona (ES)

(73) Assignee: Hewlett Packard Development Company, L.P., Houston, TX (US)

( * ) Notice: Subject to any disclaimer, the term of this patent is extended or adjusted under 35 U.S.C. 154(b) by 155 days.

(21) Appl. No.: 11/251,760

(22) Filed: Oct. 18, 2005

(65) Prior Publication Data

US 2006/0104396 A1 May 18, 2006

(30) Foreign Application Priority Data

Oct. 21, 2004  (EP)  .................................. 04025091

(51) Int. Cl.
  G06F 13/00  (2006.01)
  G06G 1/12  (2006.01)
  H04L 27/06  (2006.01)

(52) U.S. Cl. ........................ 710/110; 710/100; 375/340; 713/401

(58) Field of Classification Search .................. 710/110
  See application file for complete search history.

(56) References Cited

U.S. PATENT DOCUMENTS

| | | | | |
|---|---|---|---|---|
| 4,547,849 A * | 10/1985 | Louie et al. | ..................... | 710/3 |
| 5,257,356 A * | 10/1993 | Brockmann et al. | ......... | 710/110 |
| 5,534,805 A * | 7/1996 | Miyazaki et al. | ............ | 327/144 |
| 5,793,993 A | 8/1998 | Broedner et al. | | |
| 5,861,925 A * | 1/1999 | Fujitaka | ....................... | 348/465 |
| 5,912,572 A * | 6/1999 | Graf, III | ....................... | 327/144 |
| 6,134,670 A * | 10/2000 | Mahalingaiah | ............... | 713/401 |
| 6,233,635 B1 * | 5/2001 | Son | ............................. | 710/315 |
| 6,263,033 B1 * | 7/2001 | Hansen | ........................ | 375/370 |
| 6,263,374 B1 * | 7/2001 | Olnowich et al. | ............ | 709/253 |
| 6,321,285 B1 * | 11/2001 | Sheafor et al. | .............. | 710/306 |
| 6,332,173 B2 * | 12/2001 | Typaldos | ..................... | 710/106 |
| 6,462,782 B1 * | 10/2002 | Honda et al. | ................. | 348/465 |
| 6,516,366 B1 * | 2/2003 | Gates et al. | .................. | 710/105 |
| 6,608,703 B1 * | 8/2003 | Toriyama et al. | ............ | 358/410 |
| 6,728,908 B1 * | 4/2004 | Fukuhara et al. | ............... | 714/48 |
| 6,772,251 B1 * | 8/2004 | Hastings et al. | ............. | 710/100 |
| 6,954,810 B2 * | 10/2005 | Delaney | ..................... | 710/107 |
| 6,963,944 B1 * | 11/2005 | Rettig et al. | ................. | 710/305 |
| 6,963,968 B2 * | 11/2005 | Kori | .............................. | 713/1 |
| 7,050,518 B1 * | 5/2006 | Keller et al. | ................. | 375/354 |
| 7,089,338 B1 * | 8/2006 | Wooten et al. | .............. | 710/110 |
| 7,130,337 B2 * | 10/2006 | Hoobler | ...................... | 375/222 |

(Continued)

OTHER PUBLICATIONS

Logic Design Information—"LVDS Bus"—taken from the following website: http://web.archive.org/web/20040408105449/http://www.interfacebus.com/Design_Connector_LVDS.html Original publish data: Apr. 08, 2004—4 Pages.*

(Continued)

*Primary Examiner*—Mark Rinehart
*Assistant Examiner*—Brian T Misiura (57) ABSTRACT

A serial bus system for data communication between devices according to a master-slave protocol has a data bus connecting master and slave devices and a shared clock system arranged to provide a shared-clock signal to the master and slave devices. The master and slave devices are arranged to derive device-individual clock signals which are synchronized with data received on the data bus, from the shared-clock signal and a data-timing indication on the data bus.

14 Claims, 9 Drawing Sheets

U.S. PATENT DOCUMENTS

| | | | |
|---|---|---|---|
| 7,174,401 B2* | 2/2007 | Stuber et al. | 710/110 |
| 7,259,526 B2* | 8/2007 | Hung et al. | 315/291 |
| 2003/0161430 A1 | 8/2003 | Sou | |
| 2004/0096016 A1* | 5/2004 | Choudhury et al. | 375/340 |
| 2004/0165905 A1* | 8/2004 | Lee | 399/75 |
| 2005/0123069 A1* | 6/2005 | Akasaka | 375/316 |

OTHER PUBLICATIONS

The 12C-Bus Specification Version 2.1—Jan. 2000—46 Pages.*

* cited by examiner

Fig. 12

SERIAL BUS SYSTEM

FIELD OF THE INVENTION

The present invention relates to data communication, and, for example, to a serial bus system, a printing device comprising such a bus system and a method of data communication.

BACKGROUND OF THE INVENTION

Data transmission between electronic devices or components of electronic devices plays an important role in modern technology. With the increase in computing power and storage capacity during recent years, the data volumes to be handled by such devices have rapidly increased. Consequently, data transmission systems with ever increasing data rates have been developed.

In order to deal with these increased data rates a variety of transmission systems have been provided. Many of these transmission systems are bus systems having a shared transmission medium to enable more than two devices to be connected. Examples of these are the internal computer buses ISA and PCI, the PCMCIA bus used for portable computers, the PS/2 bus, the RS 232, USB, SCSI and IEEE 1394 (Firewire) buses to connect external devices to computers. Similarly, Ethernet and Token Ring systems are used to connect computers to LANs (Local Area Networks). An example of a bus system designed for connecting ICs in digital control systems is the $I^2C$-bus by Philips semiconductors.

In parallel buses, more than one bit is transmitted at a time over a multiplicity of parallel transmission lines, whereas in serial buses the bits are serially transmitted over one transmission line. Parallel buses achieve higher data rates, due to the simultaneous transmission, but serial buses need fewer lines (e.g. one twisted-pair line) and are therefore better suited for greater transmission distances.

The $I^2C$-bus (see e.g. "The $I^2C$-bus Specification", Version 2, January 2000) is a serial bus-system for 8-bit oriented digital control applications. Systems which make use of the $I^2C$-bus concept typically include a microcontroller and peripheral devices such as memories and I/O expanders interfaced with the bus by bus controllers. In the $I^2C$-bus, the transmission is based on a master-slave protocol. Access to the bus is governed by the device which is the "master". The other devices, the slaves, may only access the bus upon request by the master. The $I^2C$-bus is a multi-master bus which means that the role of the master may be taken by different devices. The bus has two lines, a serial data line (SDA) and a serial clock line (SCL). The serial data line carries the data between the devices connected to the bus. The master device has a master clock which puts its master-clock signal onto the clock line (SCL). The clock line (SCL) supplies the master clock signal to all slave devices which use it for reading and sending data. Thus, the $I^2C$-bus uses synchronous transmission. Due to this, the data rate of the $I^2C$-bus is limited to rates in the order of 100 kbit/s to 3 Mbit/s, and the maximum length of the bus cable is also limited.

Other known bus systems use asynchronous transmission which means that, although the rates of data bits in sequences of transmitted data (e.g. in packets, frames, etc.) are nearly the same, the data bits of different packets or frames may not lie within the same timing raster. Each bus device has its own clock, and when it receives a new data packet or frame, it synchronizes its internal clock to the bits in the packet or frame, e.g. by means of a start bit at the beginning of the packet or frame. Having synchronized its internal clock in such a way, the device is able to read the bits of the packet or frame.

SUMMARY OF THE INVENTION

A first aspect of the invention is directed to a serial bus system for data communication between devices according to a master-slave protocol. The bus system comprises a data bus connecting master and one or more slave devices, and a shared-clock system arranged to provide a shared-clock signal to the master and slave devices. The master and slave devices are arranged to derive device-individual clock signals which are synchronized with data received on the data bus, from the shared-clock signal and a data-timing indication on the data bus.

According to another aspect, a printing device is provided comprising one or more print heads, an overall printing controller, one or more print-head controllers, and a serial bus system for data communication between the printing controller and the print-head controller or controllers according to a master-slave protocol. The printing controller is a master device, and the print-head controller, or each of the print-head controllers, is a slave device. The serial bus system comprises a data bus connecting the master and slave devices, and a shared-clock system arranged to provide a shared-clock signal to the master and slave devices. The master and slave devices are arranged to derive device-individual clock signals synchronized with data received on the data bus from the shared-clock signal and a data-timing indication on the data bus.

According to another aspect, a method is provided of data communication according to a master-slave protocol between master and one or more slave devices on a serial data bus. The method comprises providing a shared-clock signal to the master and slave devices, generating, at the master and slave devices, a device-individual clock signal synchronized with data received on the data bus, said device-individual clock signal is derived by the devices from the shared-clock signal and a data-timing indication on the data bus.

Other features are inherent in the disclosed products and methods or will become apparent to those skilled in the art from the following detailed description of embodiments and its accompanying drawings.

BRIEF DESCRIPTION OF THE DRAWINGS

Embodiments of the invention will now be described, by way of example, and with reference to the accompanying drawings, in which.

The drawings and the description of the drawings are of embodiments of the invention and not of the invention itself.

DESCRIPTION OF THE PREFERRED EMBODIMENTS

Figure 1:
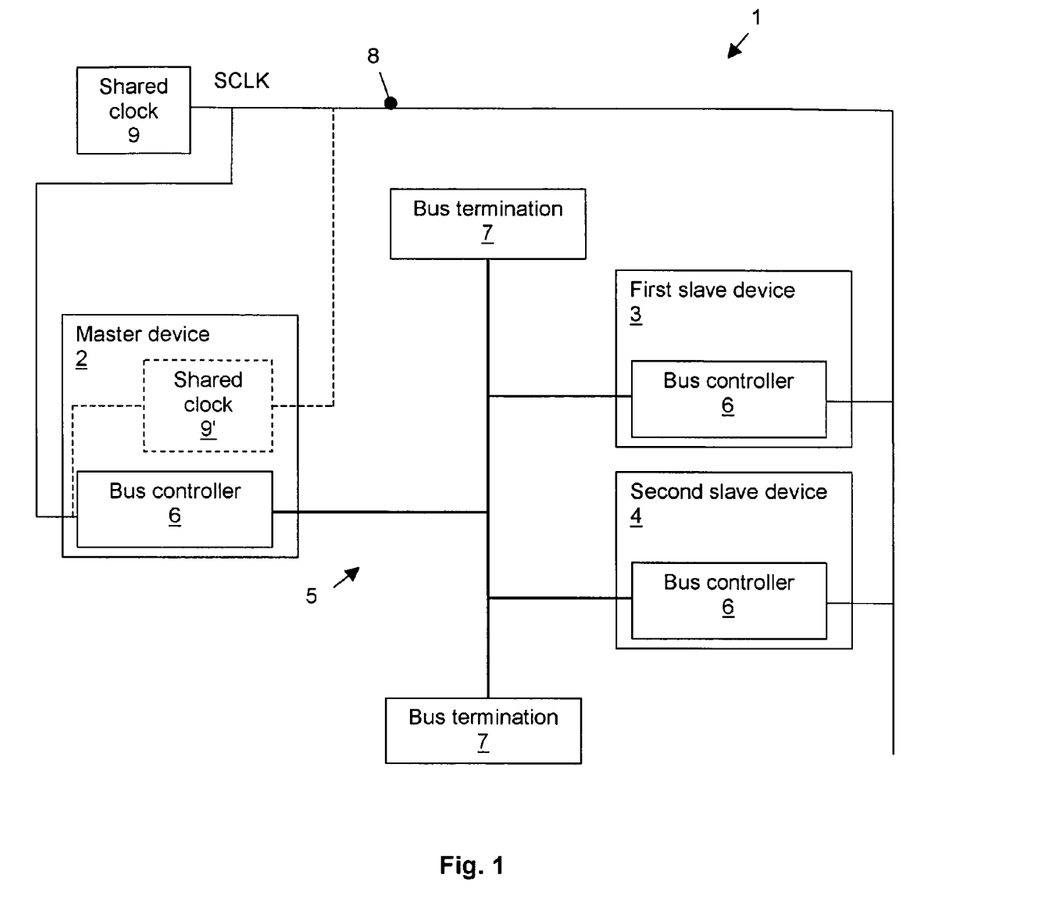
FIG. 1 is an architecture diagram of a serial bus system, according to embodiments of the invention.

FIG. 1 illustrates an architecture diagram of a serial bus system. Before proceeding further with the detailed description of FIG. 1, however, a few items of certain embodiments will be discussed.

The described embodiments of the bus system are arranged for data exchange between electronic devices, such as microprocessors, memory, I/O chips, controllers, sensors, etc. The data exchanged may be control data to control the devices connected to the bus; a bus of this kind is sometimes called a "control bus" (of course, a control bus may also exchange "content data"). In some of the embodiments, the bus system connects several devices (e.g. microchips) on the same board, in other embodiments it connects devices on different boards of one and the same apparatus, e.g. devices mounted on relatively moveable parts of the apparatus. An exemplary embodiment is a printer with one or more print heads in which a main printing controller is connected to print head controllers by the serial bus. In an ink-jet printer with moveable print heads mounted with the print-head controllers on a reciprocating carriage, the bus connects relatively moveable devices. In still further embodiments the bus connects distinct apparatus.

The bus system of the described embodiments is a serial bus system, i.e. a bus system in which the data bits are serially transmitted over one transmission line.

In the described embodiments, binary data is transmitted by electrical signals representing different logical levels. The devices connected to the bus have bus controllers able to receive and send data, i.e. to sense signals on the bus produced by other devices and put signals onto the bus. Bus drivers which detect and put the signals on the bus may be implemented in various semiconductor technologies, e.g. NMOS, CMOS, or bipolar technology. The binary data may be coded by the electrical signals in various ways, e.g. by the NRZ Code, the RZ Code, the AMI Code, the Manchester Code, the differential Manchester Code, etc. The bus has two logical levels or, with some codes, more than two logical levels (e.g., in the AMI Code, it has three logical levels). If no device puts a signal on the bus, the bus is in an undefined or "floating" state.

In some embodiments, the bus controller is a part of the device (e.g. a microchip) connected to the bus and is implemented by "hardwired" electronic circuits. In other embodiments, the bus controller is at least partially implemented by software, so that a program running the device (e.g. in a microcontroller) provides the bus controller functionality. In some embodiments, the device connected to the bus is an "interface device" which only enables other, separate devices (e.g. microchips without bus controller) to be connected to the bus.

Generally, since plural devices are connected to the bus, bus-access conflicts may occur. Therefore, a definition of a bus system normally includes a protocol which defines how the bus may be accessed by the devices. In multiple-access protocols, such as the Ethernet, all devices may access the bus without prior permission from a superordinate device (a "master device") regulating access to the bus. In such protocols, typically an arbitration procedure is defined which governs access to the bus in the case of bus-access conflicts. The described embodiments of the serial bus system, however, implement a master-slave protocol according to which only one of the devices, the master device, is allowed to access the bus (i.e. to put data on the bus) without prior permission, and all the other devices, the slave devices, are only allowed to access the bus in response to a corresponding request from the master device addressed to the respective slave device. For example, in the described embodiment of the printer equipped with the serial bus system, the printing controller is the master device, and the print-head controllers are the slave devices.

Of course, a bus system with only two device, one of which taking the role of the master device, and the other one taking the role of the (sole) slave device, is also an embodiment of the invention. In other embodiments, there are a plurality of slave devices (i.e. two or more slave devices).

In some of the embodiments of the serial bus system, the role of the master device is fixed to a certain device. In other embodiments, the role of the master device may be assigned, in a dynamic manner, to different devices, based on a master-assignment procedure, for example of the kind used in the I²C-bus.

In the described embodiments, the devices read the digital data on the bus by sampling the sequence of logical levels on the bus in a manner synchronized with the data signal. Conventionally, this sampling synchronization is either achieved by using a master-clock signal for all devices which provides a fixed timing raster (such as in the I²C-bus), or by using freely-running clocks in all devices which are synchronized to the start of each incoming data packet (also called data frame). Provided that the bit rate and the internal clock do not deviate too much from each other, and that the data packets are relatively short, the synchronism achieved in the latter way is sufficient to sample all the packet's bits in a correct manner).

In the described embodiments, however, a hybrid of such known synchronous and asynchronous synchronization schemes is used. On the one hand, a shared-clock system is arranged to provide a shared-clock signal to the master and slave devices. However, a device which wants to read data from the bus does not simply use the shared-clock signal to obtain a definition of the sampling points of time. Rather, the devices derive device-individual clock signals synchronized with data received on the data bus from the shared-clock signal and a timing-indication detected by the respective device on the data bus. In some of the embodiments, the data-timing indication is a certain bit (e.g. a start bit), or a group of bits, of a data packet or frame. In the described embodiments, each data frame has its own timing indication (e.g. start bit), so that the devices synchronize the shared clock-signal, or a signal obtained by dividing down the shared clock signal to each data frame individually, thereby obtaining their device-individual clock signal. Owing to the fact that the device-individual clock signal is derived from the shared-clock signal, the devices need not be equipped with individual free-running clocks, as in conventional asynchronous bus systems. Rather, in some of the embodiments in which the frequency of the shared-clock signal and the signal-change rate on the bus are the same, the device-individual clock signal is a phase-shifted version of the shared-clock signal. In these embodiments, the devices are arranged to synchronize their device-individual clock signal to data received on the data bus by adjusting the relative phase between the shared-clock signal and their device-individual clock signal. In other embodiments in which the frequency of the shared-clock signal is an (integer) multiple of the signal-change rate, the device-individual clock signal is a signal downscaled from the shared clock signal. In these embodiments, the devices are arranged to synchronize their device-individual clock signal to data received on the bus by adjusting the phase of the downscaled signal in the process of dividing down the shared-clock signal.

For example, in some of the embodiments in which the shared-clock signal has a higher frequency, the shared-clock signal is a 40 MHz signal. The signal-change rate of the data signal is, for example, ¼ of the shared-clock-signal frequency, i.e. 10 MHz. The device-individual clock signal is produced by dividing down the shared-clock signal by a divisor four. For example, every fourth rising flank of the clock signal is extracted to form the device-individual clock signal. To synchronize the device-individual signal to the data signal, the phase of the device-individual clock signal is adjustable in four discrete steps (each step corresponding to $0.25 \times 10^{-6}$ sec) by selecting a particular one of the four shared-clock-signal flanks occurring within one period of the device-individual clock signal.

The combined synchronous-asynchronous synchronization scheme of the described embodiments is robust against clock skew. In other words, there is no requirement that the relative timing between the shared-clock signal and the data signal is fixed for all devices, and there is no requirement that different data frames from the same device, or different devices, lie in a fixed timing raster. Rather, the timing between the shared-clock signal and the data may be different for all devices, and different data frames need not be aligned to a common timing raster. This enables data to be transmitted with high data rates, e.g. up to the order of Gbit/sec, over relatively long distances. For example, in a large-format ink-jet printer, the length of the bus connecting the stationary printing controller with the print-head controllers mounted on a moveable carriage may be in the order of five meters. On the other hand, the use of the shared-clock signal as a basis for a phase-adjusted device-individual clock signal obviates a need to equip all devices with individual clocks accurately tuned to the same clock frequency to assure that synchronization is maintained over the length of the data frames, as is the case in conventional asynchronous bus systems.

In the described embodiments, a master-slave protocol is implemented in the serial bus system according to which only the master device is allowed to put data on the bus without permission. The slave devices permanently listen to the data on the bus, and a slave device is only allowed to put data on the bus after receipt of a corresponding request from the master device addressed to the slave device.

After having received the request from the master device, and, after a turnover phase, the slave device to which the request was addressed takes control of the bus and returns a response. Often, the slave device cannot send its response immediately upon receipt of the request (for example, the device may have to perform an activity (e.g. collect sensor data)) to comply with the request, and can only respond (e.g. return the collected sensor data) after having completed this activity.

In principle, during the turnover phase, the bus is in an undefined (floating) state until the requested slave device assumes the control. In order to keep periods with a floating bus as short as possible, in some embodiments the slave device immediately drives the bus to a defined level, even if it needs more time to return its response. The slave device immediately confirms receipt of a request from the master device. In some embodiments, the activity of driving the bus to the defined level is regarded as the confirmation of receipt by the master device. After having driven the bus to a defined level and/or having confirmed receipt, the slave device is allowed to put its response to the request on the bus after a delay. In some of the embodiments, this delay is fixed, for example defined by a timer. In other embodiments, the slave device includes an indication of the expected length of delay into the confirmation of receipt immediately returned to the master device. The master device goes into a wait state corresponding to the (fixed or expected) delay. During this wait state, the master device is not allowed to put data onto the bus (of course, none of the other slave devices is allowed to, either)

An interrupt is typically an asynchronous event which may happen in any of the devices and which is to be communicated to another device (typically a superordinate device) asynchronously. In a strict sense, a pure master-slave protocol cannot implement interrupts by slave devices since the slave devices are not permitted to put any signals on the bus except at the request of the master device. However, in some of the embodiments, a pseudo-interrupt functionality is implemented: the master device permanently sends pseudo-interrupt requests to all slave devices. In response to these requests, the slave devices do not return responses with comprehensive status information (which would conventionally be sent along with an interrupt to inform the superordinate device about the interrupt state), but only return short responses in which an interrupt-status bit, or a group of such bits, may be set or not. If the master device receives a short response with the interrupt-status bit set, it returns another request to the slave device from which the short response originated. Only upon receipt of this second request does this slave device return a response with more comprehensive status information. By this two-stage interrupt-polling procedure, the slave-device's interrupt state is effectively communicated to the master device, without asynchronous messaging, and without causing too much interrupt-related load on the bus.

The data frames used in the described embodiments include a number of bits successively transmitted on the serial data bus. A data frame includes three parts, a control part, an address part and a payload part. The control part includes the timing indication for the data frame; for example, the frame's first bit acts as a start bit to which the device-individual clock is synchronized. The control part contains bits which uniquely identify the device for which a data frame is destined, a device ID. The control part may further include control-related data, for example the interrupt-status bit described above. The address part identifies a register, or registers, of the device addressed. Normally, all the devices connected to the bus listen to all data frames, but data frames with device IDs of other devices are ignored; a device only reacts to data frames addressed to itself. The payload part contains the "actual data" transmitted from one device to the other; in other words, the payload data is typically not related to the transmission process, but is the content to be transmitted. However, there is no strict assignment of the control and the payload parts in the sense that payload data might not be control-related; for example, in some embodiments the comprehensive status information in the second stage of the interrupt-polling procedure may be returned within the payload part of a frame.

In some of the embodiments, a data frame also includes a data-check part enabling transmission errors to be detected, or even corrected. Bit errors appearing in the transmission process may falsify the data transmitted. In order to detect bit errors, redundancy is introduced and transmitted in the data-check/part, which is used by the receiving device to detect whether a bit error has occurred. Depending on the degree of redundancy added, certain bit errors may not only be detected, but also corrected. In some of the embodiments, one or more parity bits, so-called block check characters (BCC) are added, for example longitudinal and transverse parity bits. In other embodiments, a check-sum based on polynomial arithmetic using a certain generator polynomial is calculated and added to the data to be transmitted, also known as Cyclic Redundancy Check (CRC). The receiving device compares the transmitted parity data or check-sum with the parity data or check-sum expected from the data received, and detects a transmission error if there is a discrepancy.

In the described embodiments, the bus has one pair line with two symmetric wires for data transmission in both directions (it is then a bi-directional, or duplex, bus, or two pair lines with two symmetric wires each (each line only transmits data in one direction). Differential signals are transmitted over the pair lines, meaning that each signal pulse on one wire is accompanied by a corresponding inverted pulse on the other wire. The receiving device is only sensitive to changes of the voltage difference between the two wires. Since unwanted signals are mostly picked up on both wires of a pair line as non-differential pulses, such unwanted signals are filtered out (i.e. not detected) by the receiving devices. In addition, in some of the embodiments, the pair line is twisted to further suppress pick-up of non-differential signals.

As explained above, the serial bus system of the described embodiments is insensitive to clock skew due to the combined synchronous-asynchronous synchronization technique used. In other words, the phase relationship between the shared-clock signal and the data signals may be different at the different devices connected to the bus. Consequently, the line carrying the shared-clock signal and the data-signal-carrying line may have different lengths and/or different signal propagation velocities. Therefore, in some of the embodiments, the data-signal line and the shared-clock signal lines are not combined in a common bus cable, but are separate lines (which may have different lengths and/or signal propagation velocities). In other embodiments, the data-signal line and the shared clock-signal line are combined in a common bus cable (which may imply that their lengths are equal, but still allows for different signal propagation velocities).

An exemplary embodiment of a printing device is disclosed having print heads, an overall printing controller and print-head controllers associated with the print heads. A serial bus system of the type described herein connects the printing controller and the print-head controllers to enable communication between these controllers according to the master-slave protocol described. The printing controller is the master device, and the print-head controllers are the slave devices. In one printer embodiment, the printer is a large-format ink-jet printer (having a print width for DIN A1/ANSI D, DIN A0/ANSI E or even larger paper format) in which the print heads are mounted, together with the print-head controllers, on a reciprocating carriage. By contrast, the printing controller is mounted in a non-moving part of the printer. Thus, the print-head controllers and the printing controller are relatively moveable. The serial-bus cable is a flexible cable connected to the relatively moveable controllers.

Returning now to FIG. 1, which illustrates an architecture diagram of a serial bus system 1. It comprises a master device 2 and two slave devices 3, 4 connected by a serial data bus 5 (the master and slave devices are sometimes simply called "master" and "slave"). The devices 2, 3, 4 have bus controllers 6 which are interfaces to the bus 5 and are responsible for reading data from and putting data onto the bus 5 and performing the corresponding control tasks according to a master-slave protocol. One of the bus controllers' 6 control tasks is to derive device-individual clock signals in each of the devices 2, 3, 4. In some of the embodiments, the devices 2, 3, 4 are microchips with "hard-wired" bus controllers 6, in other embodiments they are microprocessors in which the bus controllers 6, or a part of them, are implemented by software running on the microprocessors. In some embodiments, the devices 2, 3, 4 are interface devices the main part of which are the bus controllers 6; these interface devices serve to connect other devices (without bus interface) to the bus 5. To avoid signal reflections the bus 5 is terminated, at both ends, by bus terminations 7. The bus terminations 7 are, for example, passive resistors matched to the impedance of the bus line.

A shared-clock system includes a shared clock 9 generating a shared-clock signal SCLK and a shared-clock line 8 supplying the shared-clock signal SCLK to the bus controllers 6 of all devices 2, 3, 4 connected to the bus 5. Two different embodiments are illustrated in FIG. 1. In the first embodiment, illustrated by solid lines, the shared clock 9 is a separate component, which is not integrated into any of the devices 2, 3, 4. In the other embodiment, illustrated by dashed lines in FIG. 1, the shared clock (here denoted by 9') is a component integrated into the master device 2. In contrast to the first embodiment, the connection of the integrated shared clock 9'to the master device's bus controller 6 is a device-internal connection, as indicated in FIG. 1.

In the embodiment illustrated in FIG. 1, the bus line and the shared-clock-signal line 8 are separate lines which do not necessarily run in parallel and may have different lengths and/or impedances. In other embodiments (FIG. 12) both lines run in parallel and are combined in a common cable. In some of the embodiments, the bus line is not made up of wires, but of strip conductors on a printed board; such a strip conductor embodiment is used, for example, when all the devices 2, 3, 4 connected by the bus 5 are mounted on a common printed board.

Figure 2:
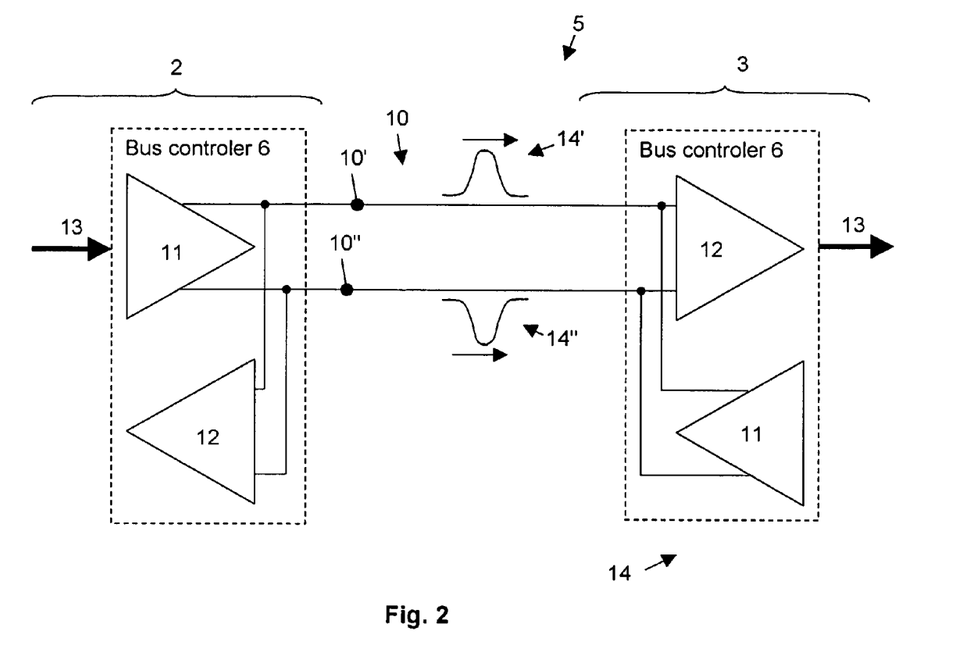
FIG. 2 schematically illustrates bus controllers, a bus line and a differential signaling technique used in the serial bus system of FIG. 1.

FIG. 2 illustrates the bus controllers 6 and the differential signaling technique used on the bus 5. The bus 5 has a pair line 10 with two wires 10', 10" which are symmetric with respect to the ground. In FIG. 2 the bus 5 is shown in a simplified manner with only two devices (master device 2 and one slave device 3), and with the parts of the bus 5 which lead to the other devices and the bus terminations shown in FIG. 1. Each bus controller 6 has a driver 11 arranged to put data onto the bus 5 and a receiver 12 arranged to read data on the bus 5. In an exemplary communication in which data 13 is to be transmitted from the master device 2 to the slave device 3, one of the bus controllers 6 (here: the bus controller 6 of the master device 2) activates its driver 11, and another bus controller (here the bus controller 6 of the slave device 3) activates its receiver 12. The driver 11 puts symmetric signals, for example signals according to the LVDS standard (IEEE standard P1596.3) on the bus line 10. A symmetric signal is composed of pulses 14', 14" on each of the wires 10', 10". The pulses 14', 14" add to zero, i.e. each pulse 14' on one of the wires 10' is accompanied by a pulse 14" having the same magnitude, but an opposite sign on the other wire 10". The receiver 12 is only sensitive to voltage-difference pulses between the two wires 10', 10"; it thereby filters pick-up signals which usually have the same sign on the two wires 10', 10".

The bus 5 illustrated in FIG. 2 is a bidirectional bus used for duplex transmission. This means that, when the bus controllers 6 of the devices 2, 3 change their roles (i.e. when the bus controller 6 of the slave device 3 activates its driver 11, and the master device 2 activates its receiver 12), pulses are transmitted in the other direction over the same bus line 10. In other embodiments, the bus has two separate bus lines, one for each direction.

In the described embodiments, the shared clock 9 also uses differential signals, e.g. according to the LVDS standard, to transmit the shared-clock signal SCLK via the shared-clock-signal line 9.

Figure 3:
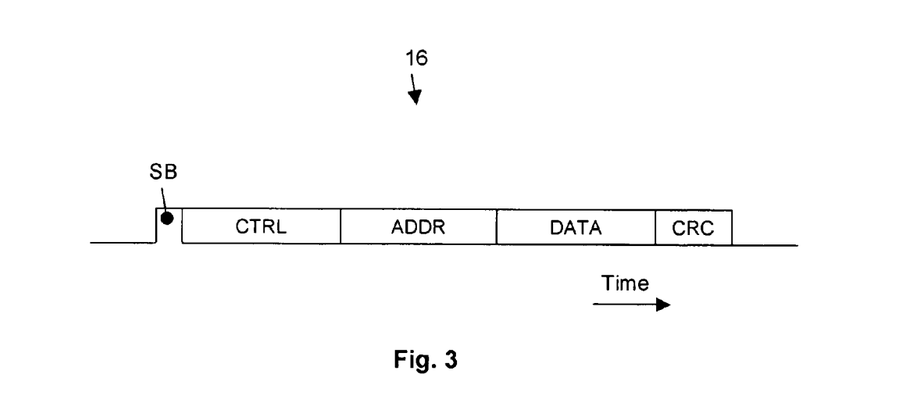
FIG. 3 schematically illustrates an exemplary data frame-structure used for data communication over the serial bus system of FIG. 1.

FIG. 3 illustrates a data-frame structure used for data communication over the serial bus system 1. A data frame 16 begins with a start bit SB which indicates the start of the data frame 16 and is used to synchronize a receiver 12 to enable data to be read from the data bus 5. The start bit SB is followed by a control part CTRL, for example eight control bits CTRL[7 . . . 0]. Some bits of the control part CTRL represent, for example, the device address, called a "device ID". Another bit (called an R/W-bit) may be used to indicate whether the master wants to read or write data from or to a slave. A further bit of the control part CTRL is a CRC-enable bit. The control part CTRL is followed by an address part ADDR (for example, eight address bits ADDR[7 . . . 0]) which, for example, identifies one of a plurality of registers of the slave 12. The address part ADDR is followed by a payload part DATA (for example eight data bits DATA[7 . . . 0] containing the data which is to be written to the addressed register (if the R/W-bit in the control byte CTRL is set). If the master device 2 performs a read access to a register of the slave (i.e. if the R/W-bit in the control register CTRL is not set), the content of the data part DATA is meaningless for the addressed slave. Finally, the address part ADDR is followed by a data-check part CRC, (for example, four check-sum bits CRC[3 . . . 0]) representing, e.g. a check-sum of the data frame 16. Other embodiments have larger control and/or address spaces and larger registers or CRC check-sums; in still further embodiments more than one payload words can be included in one data frame 16.

The same frame structure, with a start bit SB, a control part CTRL, and an address part ADDR, a payload part DATA and, optionally, a check-sum part CRC, as shown in FIG. 3 is used by the addressed slave in order to respond to a master's request. After having read a frame 16 from the master, the addressed slave takes over the control of the data bus at the end of a turnover phase. Slaves whose device IDs do not match the device ID contained in the frame 16 from the master do not react to the frame 16. The addressed slave responds by putting a frame 16 onto the data bus 5. In the frame 16 returned from the slave some of the bits in the control part CTRL may have a different meaning than that in frames from the master, i.e. these bits may have a meaning specific for responses from slaves. For example, a bit of the control part CTRL is, in some embodiments, an interrupt-status bit by which a slave, when it sends a data frame 16 to the master, may signal an interrupt. Other bits may be returned, or "echoed", in a slave's response. For example, in the frame 16 returned, the R/W-bit and the address ADDR in the master's frame 16 may be echoed. If the master's frame 16 has indicated a read access, the data part DATA contains the content of the addressed register of the slave device 3, 4. If the master's frame 16 has indicated a write access, the data part DATA may echo the data part DATA of the master's frame 16.

Figure 4:
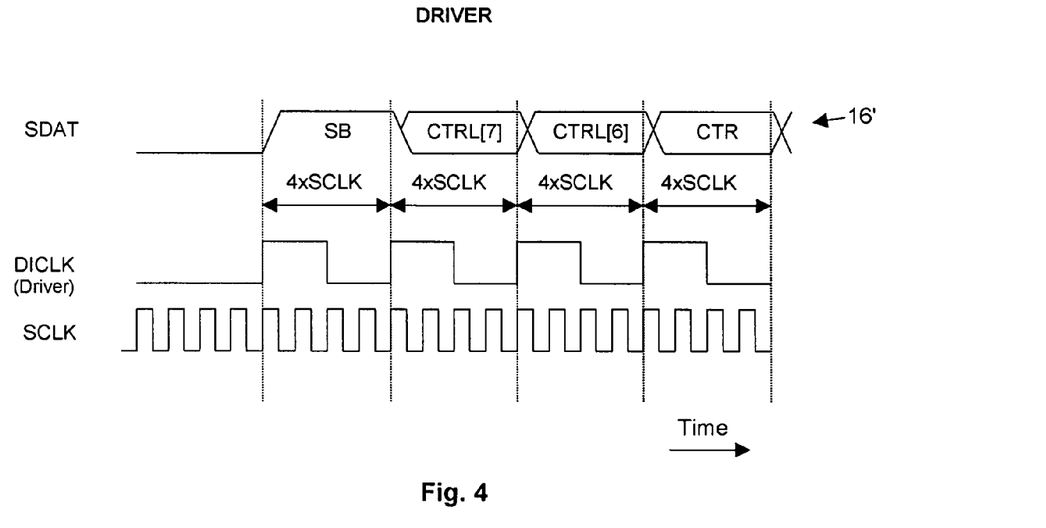
FIG. 4 shows, in an exemplary manner, pulse trains of a data signal, a device-individual clock signal of a driver, and a shared-clock signal used in the serial bus system of FIG. 1.
Figure 5:
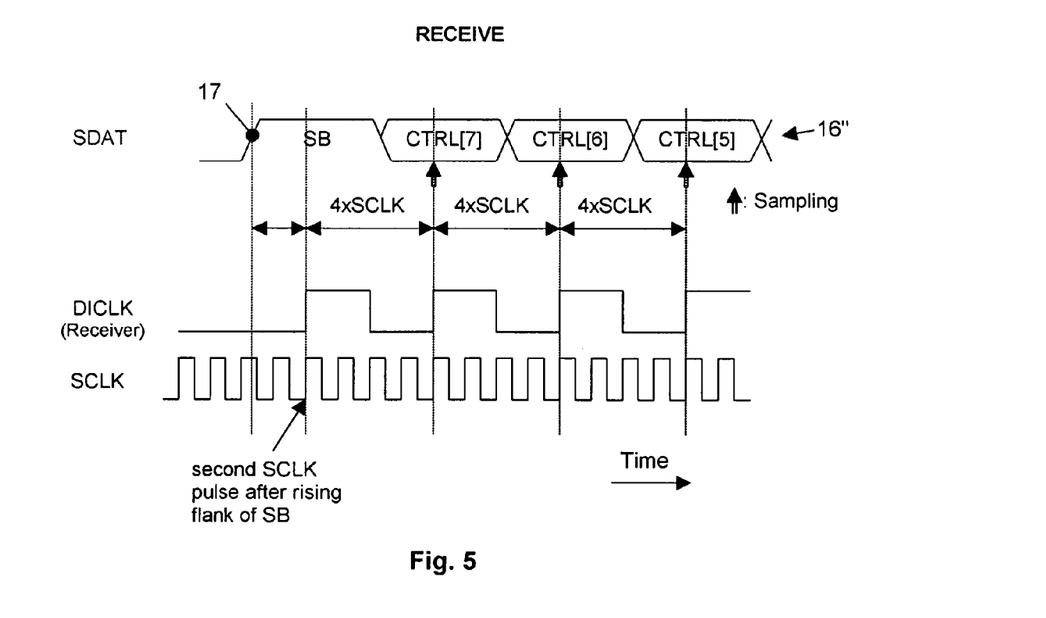
FIG. 5 illustrates how a device-individual clock signal of a receiver is synchronized to a data signal, according to an embodiment of the invention, by showing, in an exemplary manner, pulse trains of the data signal, the device-individual clock signal of the receiver, and the shared-clock signal.
Figure 7:
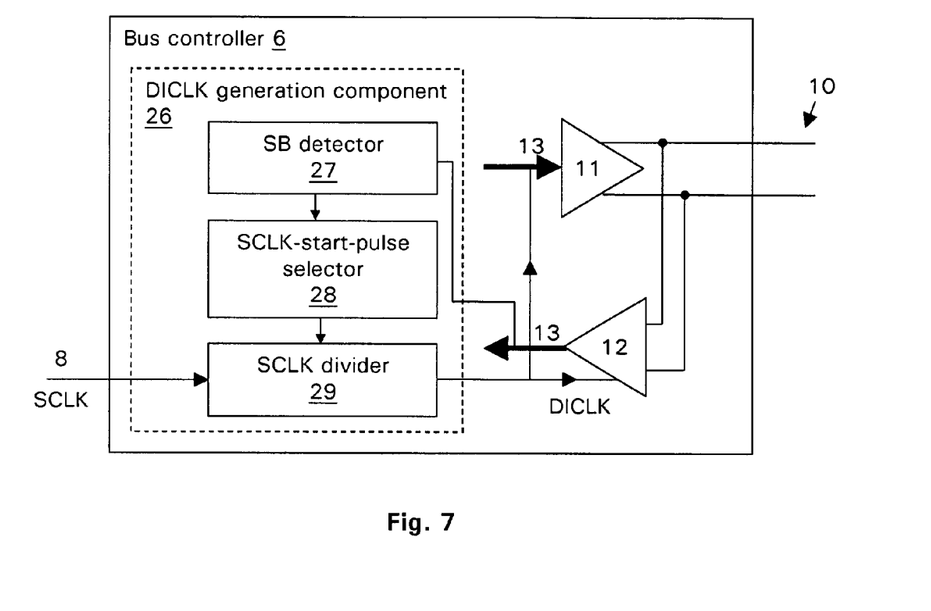
FIG. 7 is a diagram illustrating a bus controller having a component arranged to derive the device-individual-clock signal, according to an embodiment of the invention.

FIG. 4 illustrates the data timing used by a driver 11 when putting data onto the bus 5, and FIG. 5 illustrates the synchronization procedure carried out by a receiver 12 when reading data from the bus 5. The role of the driver 11 can be taken by either device, i.e. by the master device 2 or any of the slave devices 3, 4, depending on whether data is transmitted from the master device 2 to a slave device 3, 4, or vice versa. Both the device acting as the driver 12 and the device acting as the receiver produce their own device-individual clock signal DICLK. The device-individual clock signal DICLK is derived from the shared clock signal SCLK (which is supplied to all devices 2, 3, 4 via the shared-clock-signal line 8). In the example shown in FIGS. 4 and 5, the device-individual clock signal DICLK has a smaller frequency than the shared-clock signal SCLK, and is obtained by dividing down the shared-clock signal SCLK by a predefined divisor, e.g. by a divisor four. The division of the shared-clock signal SCLK is performed, for example, by a divider in the bus controller 6 which counts the SCLK pulses and produces a DICLK pulse every nth SLCK pulse, e.g. every fourth SCLK pulse (FIG. 7).

The signal representing the data frame 16 of FIG. 3 is denoted by SDAT in FIGS. 4 and 5. A driver 11 which puts the data signal SDAT onto the bus 5 is bound to the frequency obtained by dividing down the SCLK signal, but is free to start transmitting a frame at an arbitrary point of time. For example, the driver 11 may arbitrarily choose an SCLK pulse, and start dividing down the SCLK pulse at this start pulse chosen to generate the DICLK signal. Each pulse of the DICLK signal triggers the driver 11 to put a bit of the frame onto the bus 5. Consequently, the length of each bit of the SDAT signal corresponds to one period of the DICLK signal, and each bit of the SDAT signal starts with a rising flank of the DICLK signal of the driver 11 as shown in FIG. 4 for the first four bits of the data frame 16. The start bit SB is always represented by a transition between logical states (e.g. from logic-zero to logic-one), whereas the subsequent bits may either be logic-zero or logic-one, depending on the content of a data frame's instance; accordingly, both possible logical states are drawn in FIG. 4. In other embodiments, other coding schemes are used: for example, more or less than one bit may be transmitted within one DICLK period; in other embodiments, there may always be a signal transition between the bits of the SDAT signal; etc.

On the receiver's side, a task of the receiver 12 is to read the data frames 16 from the bus 5. In order to read the data, the receiver 12 synchronizes itself with the SDAT signal representing a frame 16 on the bus 5, for example in such a manner that the sampling of the SDAT signal values is performed in the middle of each bit. Since the 1:1 frequency relationship between the shared-clock signal SCLK and the data signal SDAT is maintained everywhere in the bus system (there are no frequency-shifting, but only phase-shifting elements in the bus system, the receiver 12 also uses the SCLK signal, divided down in the same manner as above, to define the sampling frequency. However, the phase relationship between the shared-clock signal SCLK and the data signal SDAT is not preserved, e.g. due to different lengths of signal and clock cables, timing tolerances in the devices 2, 3, 4, etc. Therefore, to read a frame 16, the receiver 12 synchronizes its device-internal clock signal DICLK with the data signal SDAT representing the frame 16 by adjusting its DICLK signal phase so that it samples the SDAT signal at a certain position within the bits, e.g. in the middle of the bits.

To this end, every receiver 12 is always sensitive a start bit SB of a new incoming data frame 16. For example, the receivers 12 are arranged to detect the rising flank 17 of a start bit SB. The detection of the start bit SB initiates the synchronization of the device-individual clock signal DICLK and the sampling process. In order to sample in the middle of the bits, a half-bit delay is added, e.g. by using the second SCLK pulse following the SB-flank detection as a start pulse from which the SCLK signal is divided down (by selecting each nth (e.g. fourth) SCLK pulse) to generate the receiver's DICLK signal. The pulses of the DICLK signal adjusted in this manner lie in the middle of the data bits of the SDAT signal and are used by the receiver 12 to define the sampling points of time of all bits of the present data frame 16 to be read. Of course, the rising flank 17 of the start bit SB need not necessarily coincide with a rising flank of an SCLK pulse, but rather may lie anywhere within the SCLK's signals period, as indicated in FIG. 5. Consequently, the sampling point will not be exactly in the middle of the bits to be sampled. However, since the frequency of the SCLK signal is higher than that of the SDAT signal by a factor n (e.g. 4), the maximum deviation of the sampling point from the middle position will be 1/n (e.g. ¼), which does not affect the sampling procedure.

As a result, each device 2, 3, 4 reading data on the data bus 5 derives its device-individual clock signals DICLK synchronized with the data on the data bus 5 from the shared-clock signal SCLK and the start bit SB in order to adjust its sampling points of time to the data timing. The synchronization procedure is carried out individually for each data frame, thus enabling data frames to be transmitted in an asynchronous manner.

Figure 6:
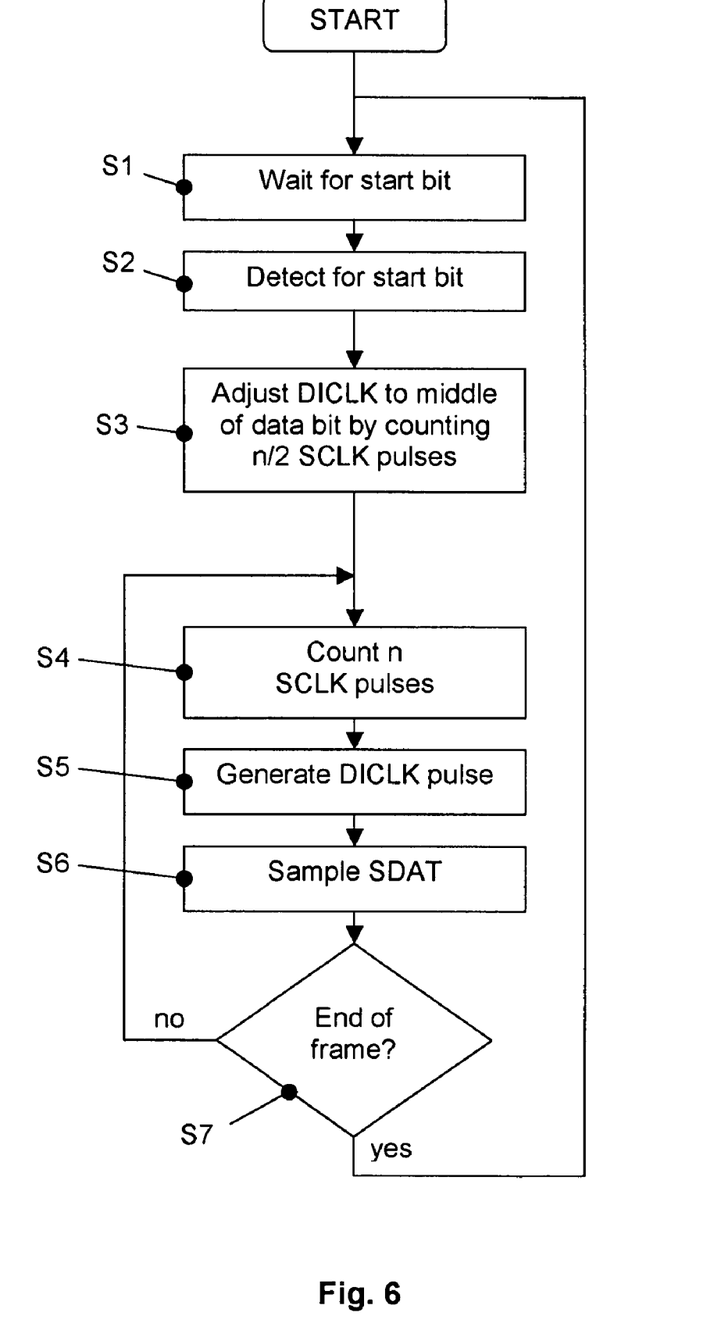
FIG. 6 is a flow diagram according to an embodiment of the invention, further illustrating the clock-synchronization and sampling procedure of FIG. 5.

FIG. 6 shows a flow diagram further illustrating the synchronization and sampling procedure performed by the bus controller 6 of a receiving device. At S1, the bus controller 6 is in a wait state, ready to detect a start bit SB. When a start bit SB is detected on the data bus at S2, this initiates the DICLK signal adjustment and sampling procedure. First, at S3, n/2 SCLK signals are counted to adjust the phase of the DICLK signal to the middle of the data bits. Then, at S4, n SCLK periods are counted and a DICLK pulse is generated at S5. At S6, the signal SDAT on the data bus 5 is sampled, wherein the sampling point of time is defined by the DICLK pulse of S5. At S7, it is ascertained whether the end of the current data frame has been reached. If it has not yet been reached, the above DICLK-pulse-generation and sampling process (S4 to S6) is repeated to sample the next data bit in the frame. If the end of the frame has been reached, the controller returns to the wait state (S1). Of course, if the controller detects that its device is not addressed, when reading the device ID in the frame's control part CTRL, sampling the frame's bits may already be terminated at that point in the control part CTRL.

FIG. 7 is a diagram illustrating a bus controller 6 having a DICLK generation component 26 arranged to carry out the DICLK synchronization procedure and the sampling procedure of FIGS. 6 and 7. A start-bit detector 27 is coupled to the receiver 12. It is arranged to detect the rising flank 17 (FIG. 5) of a new frame's start bit SB in the received data signal 13. An SCLK start-pulse selector 28 is triggered by the SB detector 27 in response to a detection of a start bit SB. Based on the timing of the detected start bit SB, the SCLK-start-pulse selector 28 selects a pulse from the SCLK signal which is in the middle of the start bit SB, as shown in FIG. 5. An SCLK divider 29 divides down the SCLK signal by a divisor n (for example, n=4), starting with the pulse selected by the SCLK start-pulse selector 28. The signal generated in this manner by downscaling the SCLK signal and phase-adjusting the downscaled signal by the SB-defined start-pulse selection is the device-individual clock signal DICLK. The DICLK signal is fed to the receiver 12 to define the points of time at which the receiver 12 samples the signal on the bus line 10, and is used to define the timing of the data 13 put onto the bus by the driven 11.

Figure 8:
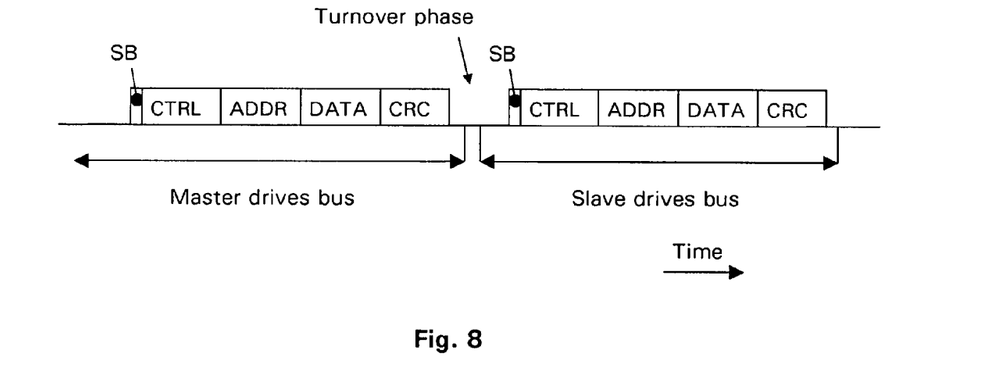
FIG. 8 is a high-level diagram illustrating an example of the sequence of a request from a master device and a response frame a slave device.

FIG. 8 is a high level diagram illustrating the sequence of a request frame 16' from a master and a response frame 16" from a slave (the frames 16', 16" corresponding to the frame 16 explained in FIG. 3). Initially, the master drives the bus; while doing so, it sends the request frame 16' addressed to a certain slave. Immediately after having sent the request frame 16', a turnover phase starts. At the beginning of the turnover phase, the bus is floating since no device is putting a signal onto the bus. Then, the slave which was addressed in the request frame 16' takes over control of the bus and puts the bus to a defined level. In some of the embodiments, this is detected by the master and regarded as a confirmation that the addressed slave has received the request frame 16'. Later, after a certain delay, the slave returns the response frame 16" to the master. At the end of the transmission of the response frame 16", the the bus is not under the slave's control any longer.

Figure 9:
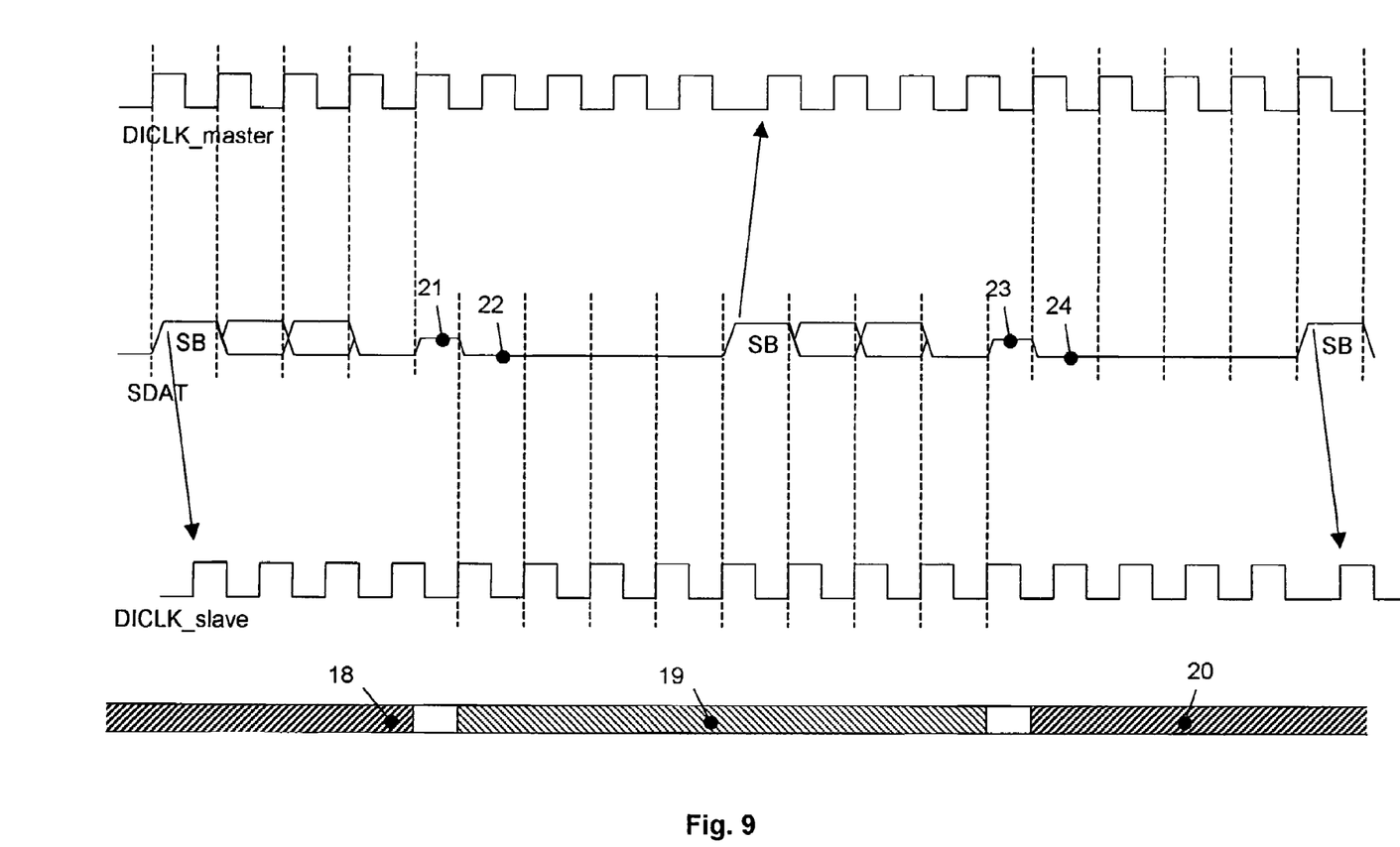
FIG. 9 illustrates the timing synchronization of FIGS. 4 to 7 in connection with the request-response sequence of FIG. 8 in more detail, according to an embodiment of the invention.

FIG. 9 illustrates the timing synchronization of FIGS. 4 to 7 in connection with the request-response sequence of FIG. 8 in more detail. The master drives the data bus during intervals 18, 20, and the slave drives the data bus during interval 19, indicated a horizontal bar at the bottom of FIG. 9. Also shown in FIG. 9 are the pulse trains of the master's and slave's DICLK signals, called "DICLK_master" and "DICLK_slave", as well as the data signal SDAT on the bus line. For the sake of simplification, no distinction is made between the SDAT signals at the master's and slave's locations, the timing of which actually differs by the respective transmission delays (i.e. the timing of a data bit sent by the master is delayed at the slave's location, and the timing of a bit sent by the slave is delayed at the master's location). Owing to the sampling synchronization applied here, such transmission delays have no impact on the devices' sampling abilities so that zero transmission delay may be assumed in the figure.

At the beginning, the master controls the bus. Initially, it drives the bus to logic-zero. The master then puts a data frame on the bus, starting with the start bit SB (only the two subsequent bits of transmitted data frames are shown in FIG. 9). The timing of the bits sent is governed by the DICLK_master signal which, in turn, is derived from the SCLK signal with an arbitrary phase, as explained in connection with FIG. 4. The slave synchronizes its internal clock signal DICLK_slave to the start bit SB of the frame sent by the master, according to the procedure explained in connection with FIG. 5. This synchronization procedure is indicated in FIG. 9 by an arrow pointing from the flank of the start bit SB to the first synchronized pulse of the DICLK_slave signal. Having synchronized its device-dependent clock to the start bit SB, the slave is able to successively sample the bits of the incoming frame in a manner synchronized to the bits of the frame. At the end of the frame, the master drives SDAT to logic-zero for one bit period and then releases the bus. Since no other device has yet taken over the control, the bus is in a floating state illustrated by an intermediate level at 21 in FIG. 9.

The slave addressed by the frame is aware that the frame's end has been reached (e.g., assuming that the frame length is a fixed predefined number, the slave can determine the frame end by counting the number of bits following the start bit SB). At 22, the slave addressed takes over control of the bus by driving it to logic-zero no later than one bit period after the master has released the bus. Driving the bus to logic-zero is regarded by the master as a confirmation that the addressed slave has received the frame. After a delay period (four bits in FIG. 9), the slave starts to put a response frame onto the bus, which again starts with a start bit SB. If the slave needs more time to respond, it keeps SDAT to logic-zero until its response is ready. In some embodiments, a fixed time limit to respond is predefined. If the slave addressed does not confirm the receipt of the initial request frame, or does not return its response frame within the time limit, the master resumes control over the bus.

Assuming that the slave's response frame is sent within the time limit, the master synchronizes its internal clock DICLK_master to the start bit SB of the slave's response frame, as indicated by a second arrow in FIG. 9, and samples the bits of the slave's response frame, wherein the timing of sampling is governed by the master's synchronized DICLK_master signal. At the end of the response frame, the slave drives the bus to logic-zero and then releases it. Again, at 23, no device has control over the bus, so that the bus is in a floating state. At 24, the master resumes control over the bus and may then (e.g. after a four bit period in FIG. 9) another frame to another or the same slave.

The vertical dashed lines in FIG. 9 indicate which DICLK pulses trigger the generation of the SDAT pulses (i.e. the bits) by the master and the slave.

The synchronization procedure described causes a phase jump of the associated DICLK signal, as can be seen in FIG. 9 in the DICLK_master signal at the upward arrow, and in the DICLK_slave signal at the right-hand downward arrow.

Figure 10:
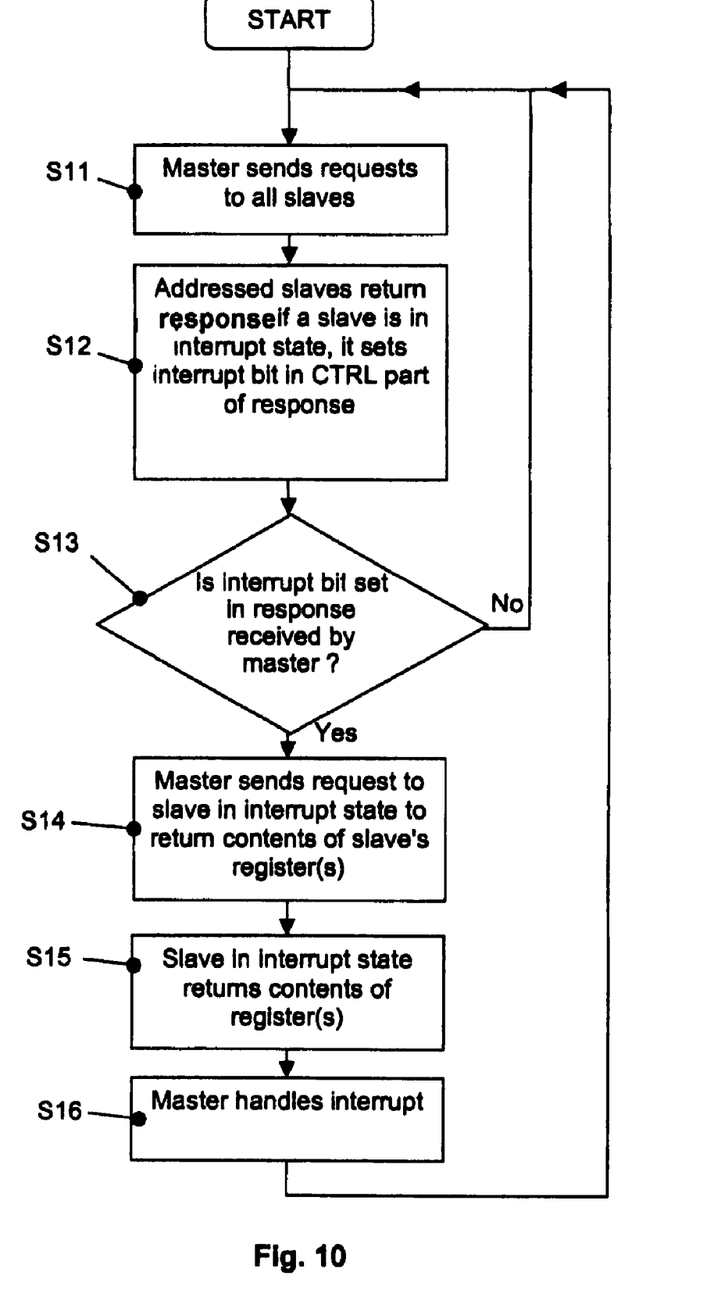
FIG. 10 is an exemplary flow diagram illustrating an interrupt process.

FIG. 10 illustrates an embodiment of an interrupt procedure. At S11, the master sends requests to all slaves, consecutively one after the other. In response to such a request, an addressed slave returns a response frame to the master. At S12; if the slave is in an interrupt state, it sets the interrupt bit in the control part CTRL of the response frame returned. At S13, the master ascertains whether the interrupt bit is set in any of the responses received. If the answer is affirmative, the master sends, at S14, a request to the slave to return the content of a slave's register. At S15, the slave to which this request is addressed returns the required content of its referenced register. If the master needs the content of more than one slave register, it accordingly may send more than one request (S14), and the slave may return more than one response (S15). Having now received all the interrupt-relevant information contained in the register(s) of the slave, the master handles the interrupt, at S16. For example, if the slave has signaled with the interrupt that it has finished a certain task, the master could resume a process which was waiting for this. The flow may then return to S11 so that the master is able to become aware of new interrupt states. If, at S13, the answer is negative, the flow returns directly to S11, without any further interrupt processing.

Figure 11:
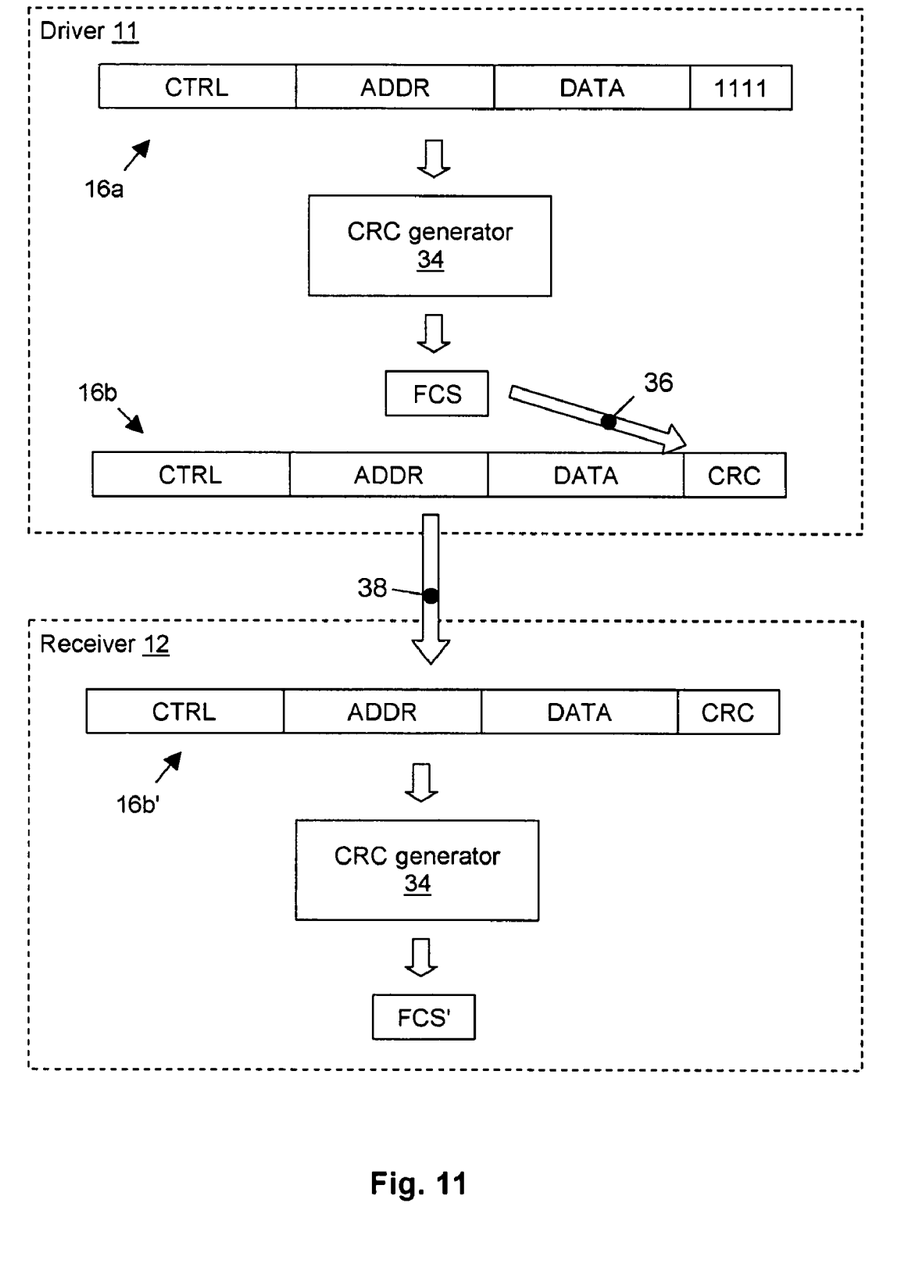
FIG. 11 illustrates an embodiment of CRC processing.

As mentioned in connection with FIG. 3, a data check procedure, for example a Cyclic Redundancy Check (CRC), may optionally be carried out for all, or some of, the data frames 16 transmitted. An embodiment of a CRC procedure is illustrated in FIG. 11. In the example shown, four CRC bits, CRC [3], . . . , CRC [0], are calculated by the device sending a data frame, and are added to the data frame transmitted. For example, a CRC generator 34 within the bus controller of a device acting as the driver 11 is arranged to generate a four-bit frame check sequence FCS from the bits in a frame 16 to be transmitted. The CRC generator 34 implements a polynomial divider, e.g. based on the primitive polynomial $P(x)=x^4+x+1$.

In other words, the CRC generator 34 generates from the bits in the frame 16 four FCS bits FCS[3 . . . 0] according to the following relations:

$$FCS[0]=d[23]\string^d[21]\string^d[19]\string^d[18]\string^d[15]\string^d[11]\string^d[10]\string^d[9]\string^d[8]\string^d[6]\string^d[4]\string^d[3]\string^d[0]\string^CRC[0];$$

$$FCS[1]=d[23]\string^d[22]\string^d[21]\string^d[20]\string^d[18]\string^d[16]\string^d[15]\string^d[12]\string^d[8]\string^d[7]\string^d[6]\string^d[5]\string^d[3]\string^d[1]\string^d[0]\string^CRC[1];$$

$$FCS[2]=d[23]\string^d[22]\string^d[21]\string^d[19]\string^d[17]\string^d[16]\string^d[13]\string^d[9]\string^d[8]\string^d[7]\string^d[6]\string^d[4]\string^d[2]\string^d[1]\string^CRC[2];$$

$$FCS[3]=d[23]\string^d[22]\string^d[20]\string^d[18]\string^d[17]\string^d[14]\string^d[10]\string^d[9]\string^d[8]\string^d[7]\string^d[5]\string^d[3]\string^d[2]\string^CRC[3].$$

The symbol '^' denotes the exclusive-OR (XOR) operation. As in FIG. 3, the frame neglecting the start bit has 24 bits d[23 . . . 0] plus four CRC bits CRC[3 . . . 0], wherein bits d[23 . . . 16] represent control bits CTRL[7 . . . 0], bits d[15 . . . 8] represent address bits ADDR[7 . . . 0], and bits d[7 . . . 0] represent data bits DATA[7 . . . 0] of the frame.

Before running the CRC generator 34, the frame's CRC bits are preset to logic-one. The CRC generator 34 then computes the frame check sequence FCS of the frame 16a. The FCS is then written into the CRC bits CRC[3 . . . 0] (cf. arrow 36) and resulting frame 16b is then transmitted over via the data bus (cf. arrow 38).

The bus controller of the device acting as the receiver 12 passes the received frame 16' through the same polynomial divider by means of the receiver's CRC generator 34. The resulting frame check sequence FCS' (which is the remainder of the polynomial division) is compared to the bit sequence &b1111, which is expected in the absence of a transmission error. Any discrepancy between FCS' and &b1111 is indicative of a bit error in the transmitted frame 16b'. The transmitted erroneous frame 16' may then be rejected, and the transmission of frame 16 may be repeated.

Figure 12:
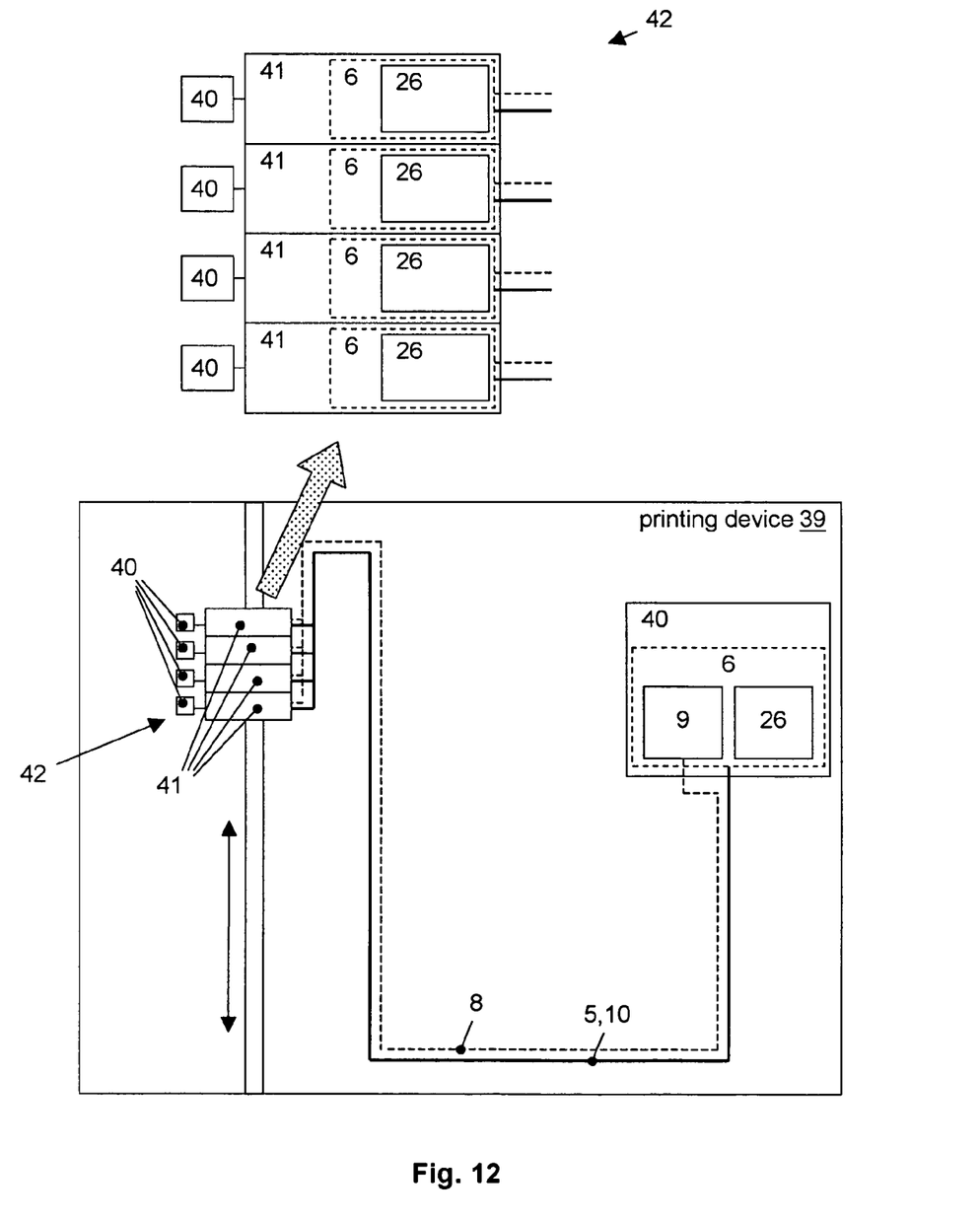
FIG. 12 is a schematic diagram of a an exemplary ink-jet printer with a serial bus system connecting a printing controller and print-head controllers, according to an embodiment of the invention.

FIG. 12 is a schematic diagram of an ink-jet printer 39, equipped with a serial bus system 1, as described in connection with the previous figures. The printer 39 is a large-format printer, having a print width for DIN A1/ANSI D, DIN A0/ANSI E or even larger paper format. The printer 39 has several (for example, four) print heads 40; each print head 40 is associated with its own print-head controller 41. The print heads 40 and the controllers 41 are mounted on a reciprocating carriage 42. An overall printing controller 43 is arranged in a stationary manner in the printer 39. The printing controller 43 is arranged to receive image data representing images to be printed from outside and perform print-preparation processing on this data. It outputs processed image data which is further processed by the print-head controllers 41 to generate control signals controlling the print head's 40 ink-application activity, for example by controlling ink nozzles arranged in the print-head.

The printing controller 43 and the print-head controllers 41 are connected by a serial bus 5, and they are equipped with bus controllers, as described in connection with FIGS. 1 to 11. The printing controller 43 is the master device, and the print-head controllers 41 are the slave devices, corresponding to the master and slave devices 2, 3, 4 described above. The printer 39 is also equipped with a shared clock, which, for example, is a part of the printing controller 43. All the controllers 41 and 43 are equipped with a DICLK generation component 26 according to FIG. 7 to synchronize their device-individual clock signal to data signals on the bus 5, as described in connection with the previous figures.

In the embodiment shown in FIG. 12, the bus line 10 and the clock line 8 are combined into a common cable, so that both lines run in parallel. The cable, up to several meters long, is flexible to enable the print-head controllers 41 to be moved in relation to the printing controller 43.

Depending on the format of the printer 39, the cable may be relatively long, for example, in the order of 5 m. Owing to the combined synchronous-asynchronous synchronization technique described, data can be transmitted with high data rates (up to Gbit per second), despite the bus's length; nevertheless, the controllers 43, 41 do not need individual clocks.

All publications and existing systems mentioned in this specification are herein incorporated by reference.

Although certain methods and products constructed in accordance with the teachings of the invention have been described herein, the scope of coverage of this patent is not limited thereto. On the contrary, this patent covers all embodiments of the teachings of the invention fairly falling within the scope of the appended claims either literally or under the doctrine of equivalents.

The invention claimed is:

1. A serial bus system for data communication between devices according to a master-slave protocol, comprising:
    a data bus connecting master and slave devices;
    a shared-clock system arranged to provide a shared-clock signal to the master and slave devices;
    wherein the master and slave devices are arranged to derive device-individual clock signals which are synchronized with data received on the data bus, from the shared-clock signal and a data-timing indication on the data bus,
    in which the master and slave devices are arranged to communicate in a manner in which the master device is the only device allowed to initiate transmissions by sending a request addressed to a slave device, and a slave device is only allowed to put data on the bus in response to a corresponding request from the master device addressed to said slave device,
    in which the master and slave devices are arranged to communicate in a manner in which, when the master device has sent a request to a slave device, said slave device takes control of the bus after a turnover phase and returns a response, wherein in the turnover phase, the bus is in an undefined floating state until the slave device assumes control of the bus,
    in which the master and slave devices are arranged to communicate in a manner in which, after the turnover phase, a slave device immediately confirms a receipt of a request, and is allowed to put its response to the request on the bus after a delay that is fixed by a timer, and
    in which the master and slave devices are arranged to communicate in a manner in which the master device sends pseudo-interrupt requests to all slave devices, wherein, in response, a slave device may signal an interrupt state by a status bit, or a group of status bits, wherein the slave device signals the interrupt state only in response to receiving the pseudo-interrupt request and the slave device does not signal the interrupt state until the slave device has received the pseudo-interrupt request, and wherein if the master device receives the status bit or group of status bits, the master device sends a second request to the slave device that sent the status bit or group of status bits and upon receipt of the second request the slave device that sent the status bit or group of status bits sends a response with comprehensive information to the master device.

2. The serial bus system of claim 1, wherein the master and slave devices are arranged to transmit and receive data grouped in data frames, wherein the data-timing indication is a certain bit, or a group of bits, in the data frames.

3. The serial bus system of claim 1, wherein the master and slave devices are arranged to transmit and receive data grouped in data frames, wherein a data frame has its own timing indication, and wherein the devices are arranged to synchronize their device-individual clock signal to the data in a data frame using the data frame's timing indication.

4. The serial bus system of claim 1, wherein the master and slave devices are arranged to synchronize an internal clock signal by adjusting a relative phase between the shared-clock signal and the device-individual clock signal frequency.

5. The serial bus system of claim 1, wherein the shared and the device-individual clock signals have frequencies, and the shared-clock signal's frequency is an integer multiple of the device-individual clock signal's frequency, and wherein the devices are arranged to generate an internal clock signal by dividing down the shared-clock-signal, and to synchronize it to the data by choosing an appropriate phase of the divided signal.

6. The serial bus system of claim 1, in which the slave devices are arranged, after the turnover phase, to drive the bus to a defined level, wherein driving the bus to the defined level is considered as the confirmation of receipt by the master device.

7. The serial bus system of claim 3, wherein a data frame comprises a control part, including the data-timing indication, an address part addressing one of the devices, and a payload part including payload data.

8. The serial bus system of claim 3, wherein a data frame comprises a data-check part enabling transmission errors to be detected.

9. The serial bus system of claim 1, arranged to propagate data signals on the bus as differential signals.

10. The serial bus system of claim 1, wherein the bus is a bi-directional bus.

11. The serial bus system of claim 1, wherein the serial bus-system comprises a serial-bus line on which the data signals are propagated, and the shared-clock system comprises a shared-clock line to supply the devices with the shared-clock signal, and wherein the serial-bus line and the shared-clock line are combined in a common bus cable.

12. The serial bus system of claim 1, wherein the serial bus-system comprises a serial-bus line on which the data signals are propagated, and the shared-clock system comprises a shared-clock line to supply the devices with the shared-clock signal, and wherein the serial-bus line and the shared-clock line are not combined in a common cable, but are separate lines.

13. A printing device comprising: one or more print heads, an overall printing controller, one or more print-head controllers, and a serial bus system according to claim 1 for data communication between the printing controller and the print-head controller or controllers according to a master-slave protocol, wherein the printing controller is a master device, and the print-head controller, or each of the print-head controllers, is a slave device.

14. A method of data communication according to a master-slave protocol between master and slave devices on a serial data bus, comprising:
    providing a shared-clock signal to the master and slave devices;
    generating, at the master and slave devices, a device-individual clock signal synchronized with data received on the data bus, said device-individual clock signal is derived by the devices from the shared-clock signal and a data-timing indication on the data bus,
    in which the master and slave devices are arranged to communicate in a manner in which the master device is the only device allowed to initiate transmissions by sending a request addressed to a slave device, and a slave device is only allowed to put data on the bus in response to a corresponding request from the master device addressed to said slave device, in which the master and slave devices are arranged to communicate in a manner in which, when the master device has sent a request to a slave device, said slave device takes control of the bus after a turnover phase and returns a response, wherein in the turnover phase, the bus is in an undefined floating state until the slave device assumes control of the bus, in which the master and slave devices are arranged to communicate in a manner in which, after the turnover phase, a slave device immediately confirms a receipt of a request, and is allowed to put its response to the request on the bus after a delay that is fixed by a timer, and in which the master and slave devices are arranged to communicate in a manner in which the master device sends pseudo-interrupt requests to all slave devices, wherein, in response, a slave device may signal an interrupt state by a status bit, or a group of status bits, wherein the slave device signals the interrupt state only in response to receiving the pseudo-interrupt request and the slave device does not signal the interrupt state until the slave device has received the pseudo-interrupt request, and wherein if the master device receives the status bit or group of status bits, the master device sends a second request to the slave device that sent the status bit or group of status bits and upon receipt of the second request the slave device that sent the status bit or group of status bits sends a response with comprehensive information to the master device.

* * * * *